(12) United States Patent
Kann

(10) Patent No.: US 9,608,356 B2
(45) Date of Patent: Mar. 28, 2017

(54) COVER COMPONENT FOR CONNECTION PORT

(71) Applicant: GN Netcom A/S, Ballerup (DK)

(72) Inventor: Peter Ulrik Kann, Ballerup (DK)

(73) Assignee: GN NETCOM A/S (DK)

( * ) Notice: Subject to any disclaimer, the term of this patent is extended or adjusted under 35 U.S.C. 154(b) by 0 days.

(21) Appl. No.: 14/971,810

(22) Filed: Dec. 16, 2015

(65) Prior Publication Data

US 2016/0181718 A1   Jun. 23, 2016

(30) Foreign Application Priority Data

Dec. 17, 2014 (EP) .................................. 14198432

(51) Int. Cl.
*H01R 13/447* (2006.01)
*H04R 1/08* (2006.01)
*H04R 1/10* (2006.01)

(52) U.S. Cl.
CPC .......... *H01R 13/447* (2013.01); *H04R 1/083* (2013.01); *H04R 1/105* (2013.01); *H04R 1/1091* (2013.01); *H04R 1/1008* (2013.01); *H04R 1/1025* (2013.01); *H04R 2420/09* (2013.01)

(58) Field of Classification Search
None
See application file for complete search history.

(56) References Cited

U.S. PATENT DOCUMENTS

| | | | | |
|---|---|---|---|---|
| 7,020,300 B1* | 3/2006 | Villaverde | ........... | H04R 1/1058 381/374 |
| 7,530,823 B1* | 5/2009 | Thornton | ............. | H01Q 1/2275 439/131 |
| 8,275,165 B2* | 9/2012 | Birch | ...................... | H04M 1/05 381/375 |
| 2005/0213774 A1* | 9/2005 | Kleinschmidt | ...... | H04R 1/1083 381/71.6 |
| 2010/0150371 A1* | 6/2010 | Cheng | .................. | H04R 1/1091 381/74 |
| 2011/0110553 A1* | 5/2011 | Logan | .................. | H04R 1/1041 381/380 |

(Continued)

FOREIGN PATENT DOCUMENTS

EP   1768365   3/2007
WO   WO 2012/072015   6/2012

OTHER PUBLICATIONS

European Search Report for European application No. EP 14198432 dated Jun. 15, 2015.

*Primary Examiner* — Paul Huber
(74) *Attorney, Agent, or Firm* — Altera Law Group, LLC

(57) ABSTRACT

Disclosed is a headset and a cover component for a connection port in a housing portion of a headset, wherein the cover component is movable relative to the position of the connection port, where the cover component is arranged to at least partly enclose at least a part of the housing portion, and where the cover component is configured to be:
arranged in a first position where the connection port is uncovered by the cover component, and where a cable is configured to be inserted into the connection port; and
arranged in a second position where the connection port is covered by the cover component.

15 Claims, 7 Drawing Sheets

(56) References Cited

U.S. PATENT DOCUMENTS

2013/0017696 A1\* 1/2013 Alvarez Rivera ... H01R 13/447
 439/142
2016/0037248 A1\* 2/2016 Cheng .................... H04R 1/105
 381/74

\* cited by examiner

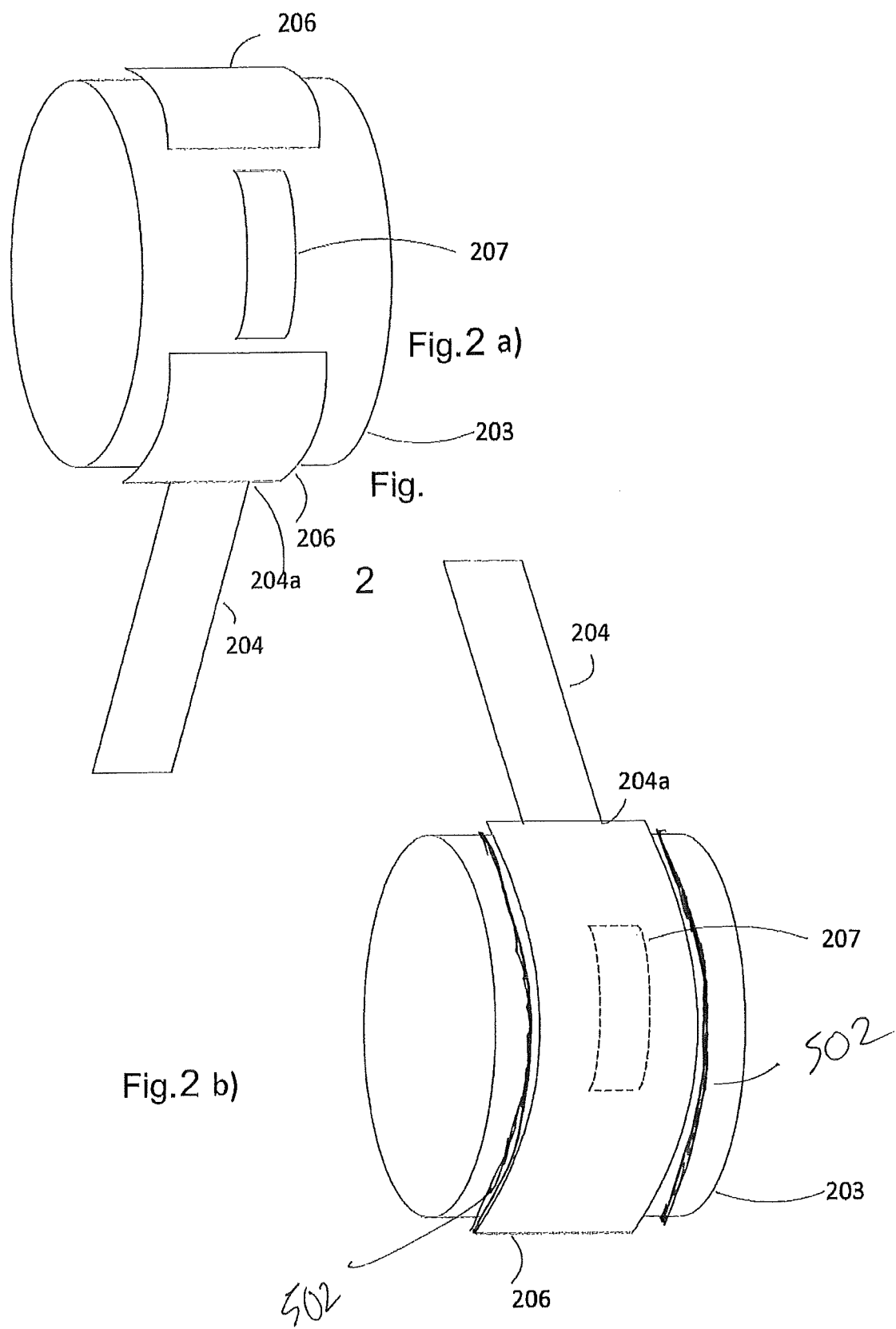

COVER COMPONENT FOR CONNECTION PORT

FIELD

The present disclosure relates to a headset and a cover component for a connection port in a housing portion of a headset, wherein the cover component is movable relative to the position of the connection port.

BACKGROUND

Headsets and earphones and other portable electronic devices such as mobile phones, tablets or laptops comprise connections ports for insertion of cables, for example for charging the battery of the device. Such a connection port is either not covered when not in use, for example in laptops the connection port is uncovered at all times, or the connection port may be closed by a small cap, when not in use, for example in a mobile phone.

SUMMARY

Disclosed is a cover component for a connection port in a housing portion of an headset, wherein the cover component is movable relative to the position of the connection port, where the cover component is arranged to at least partly enclose at least a part of the housing portion, and where the cover component is configured to be:
- arranged in a first position where the connection port is uncovered by the cover component, and where a cable is configured to be inserted into the connection port; and
- arranged in a second position where the connection port is covered by the cover component.

The cover component for the connection port provides that the connection port is closed when not in use, such as when the headset is used for its normal use, such as when the headset is used for or configured for transmission of audio. When the connection port is closed by the cover component, the connection port is waterproof or watertight and dirtproof, whereby dirt from surroundings or sweat from the headset user is prohibited from entering the connection port. The connection port comprises various electronic parts as the connection port may be used for charging the headset and/or used for updating the software of the headset. Thus it an advantage of the cover component that it closes or seals the connection port thereby prohibiting sweat with salts or other liquids or dirt from entering the connection port and reaching the electronic parts of the connection port.

In prior art, if a cap is used for closing a connection port, the connection port is only closed completely if the user of the headset closes the cap correctly by clicking or snapping the cap firmly, which often fails, as the user forgets to close the cap or if the user does not close the cap completely as it may be difficult to close the cap, if it is small or is a tight fit.

It is an advantage of the cover component that when it is arranged in its second position, the cover component covers or closes or seals the connection port, and in this second position the headset may be used for its normal use, thus the connection port may be closed before the headset can be used as headset, whereby it ensured that the connection port is only uncovered or exposed or open, when it is not in use as a headset, thereby reducing the time the connection port is open whereby the amount of dirt, sweat etc. entering the connection port is reduced.

The cover component may thus be arranged or positioned or rotated in or into its first position where the connection port may be uncovered or exposed by the cover component, and where a cable is configured to be inserted into the connection port, for example where the headset is configured to be charged by insertion of a charger into the connection port. The connection port may also and/or additionally and/or alternatively be used as a port, such as an updating port, for updating the software of the headset by insertion of a cable, wire, USB plug, etc. for updating the software of the headset.

The cover component may be arranged or positioned or rotated to at least partly enclose or encase or surround at least a part of the housing portion. The cover component may fully enclose the housing portion if e.g. the cover component is a closed component such as a full piece of component, e.g. with a cutout for uncovering the connection port. The cover component may partly enclose the housing portion if e.g. the cover component is an open component which does not fully encase the housing portion.

The housing portion or main body may be cylindrical, such as circular cylindrical. The housing portion may be defined by a three dimensional (3D) axis system, where the x direction may be defined as the axis around which the cover component is configured to move, turn, rotate etc. relative to the housing portion.

Thus the cover component may be configured to rotate relative to the x-axis of the housing portion to uncover or expose the connection port.

Alternative and/or additionally, the cover component may be configured to slide or shift sideways along the x-axis of the housing portion to uncover or expose the connection port.

The housing portion or main body of the headset may comprise a processing unit, and/or a transceiver connected to the processing unit and being configured for outputting a transceiver output signal representative of an audio signal to form a input signal to the processing unit, and/or an earphone comprising a speaker configured for transmission of an audio to the user of the headset, and/or a battery.

The headset may comprise a microphone boom, and/or a headband, and/or a neckband, and/or one or more earphones, where the one or earphones may be structurally implemented in the housing portion or be separate of the housing portion.

The headset is configured to be charged by insertion of a charger into the connection port, i.e. the battery of the headset is configured to be charged by a charger in the connection port In some embodiments the cover component comprises a cut-out for uncovering the connection port, when the cover component is arranged in its first position. The cut-out may be a space or hole left in the cover component after cutting or removing or leaving out a piece of the cover component. The cut-out may match or correspond to or fit in size to the connection port, such that only the connection port is uncovered by the cut-out, when the cover component is arranged in its first position. Alternatively, the cut-out may be larger than or have an area which is larger than the cross sectional area of the connection port in the housing portion.

The cut-out may have a shape which is square or rectangular or circular or oval. The cut-out may be a cut-through or an intersection of the cover component extending along the entire width of the cover component, whereby the cover component comprises two ends which do not touch each other. Alternatively the cut-out may be a space or hole which only takes up a part of the width of the cover component, whereby the cover component is a closed piece, i.e. having no ends.

In some embodiments the cover component is rotatable relative to the housing portion. Thus if the housing portion is circular cylindrical, the cover component may be rotatable relative to the housing portion. Alternatively, if the housing portion is squared or rectangular cylindrical, the cover component may be turnable relative to the housing portion, such as configured to be arranged in four different positions, one position for each plane or face of the square or rectangular cylinder.

In some embodiments the cover component is structurally connected, for example engaged, casted, moulded or glued, to an ear hook or an attachment means of the headset, where the ear hook or attachment means is configured for attaching the headset to an ear of a user, when the headset is configured to be used for its normal use, i.e. transmission of audio.

For example the cover maybe a resilient band material, such as a rubber or silicon band which is completely circumferentially encircles a cylindrical housing such as in FIG. 4 or a spring material which produces a bias force when expanded larger than its diameter at rest, a protruding pair of partially or fully circumferential protruding ridges 502 (FIG. 2*b* in the housing 203 may be provided to prevent the cover from sliding transversely and losing its alignment with the port aperture 207

In some embodiments the cover component is structurally connected, for example engaged, casted, moulded or glued, to a microphone boom of the headset. The microphone boom is configured to capture audio signals, such as speech, from the user of headset, and is configured to be arranged close to the users mouth for capturing the audio signals herefrom.

In some embodiments the cover component is circular, for example substantially circular. Alternatively, the cover component may be cylindrical, rectangular, squared, plane, oval etc. The cover component is configured to fit to the housing portion, and thus resembles the shape of the housing portion, such as resembling the outer dimension of the housing portion. If the housing portion is circular, the cover component should preferably be circular as well etc. The cover component may preferably be cylindrical or round because the battery of the headset is typically arranged in the housing portion and the battery is typically round, so the housing portion is constructed to fit around the battery, while keeping the housing portion as little as possible.

In some embodiments the cover component is configured to entirely or wholly or substantially or fully enclose the circumference of the housing portion. Thus the cover component may be a closed component completely encircling the housing portion. When the housing portion is for example circular cylindrical the cover component may enclose the circumference of the housing portion. If the housing portion is not circular cylindrical or the like, the cover component may be configured to enclose the linear distance around the edge of the housing portion in or about one axis, for example the x axis.

In some embodiments the cover component is configured to partly enclose the circumference of the housing portion. When the cover component is arranged in its first position, a part of the cover component does not enclose the housing portion, i.e. the connection port is uncovered or exposed by the cover component not enclosing the part of the housing portion where the connection port is arranged. The cover component may be termed an "open component" in this example, as the cover component is not closed all the way around the circumference of the housing portion.

In some embodiments the cover component is configured to be arranged to at least partly enclose a major part of the housing portion, such as a major part of the circumference of the housing portion, when the housing portion is for example circular cylindrical. This may apply both when the cover component entirely encloses and when the cover component only partly encloses the housing portion, such as the circumference of the housing portion. If a major part, such as a majority, a main part, the most of, or a greater part of the housing portion is at least partly enclosed by the cover component, the cover component will have a better fit and stability on the housing portion. A major part may be such as more than 50%, 60%, 70%, 80%, or 90% of the area or the area of the circumference of the housing portion. The full circumference of the housing portion is 360 degrees when the housing portion is circular cylindrical, so the cover component may cover more than 180 degrees, more than 200 degrees, more than 250 degrees, more than 300 degrees, more than 350 degrees of the circumference of the housing portion.

In some embodiments the cover component is configured to be arranged to at least partly enclose a minor part of the housing portion, such as a minor part of the circumference of the housing portion. Only a minor part of, for example the circumference, of the housing portion may be enclosed by the cover component, when for example the cover component is configured to be shifted or slided in the x direction to cover and uncover the connection port, as the cover component should be small enough to be shifted or slided sideways on the housing portion.

In some embodiments the cover component is made of a resilient material, for example a material which is more resilient than the material of the housing portion. The material can for example be soft, flexible rubber. The material may exhibit or provide suitable friction for attaching the cover component in position on the housing portion such that the cover component does not slide, shift or move unintendedly. The resilient material may provide that the cover component seals the connection port, such that the connection port becomes watertight against for example sweat from the user.

In some embodiments the cover component is configured to be arranged to at least partly enclose a central portion of the housing portion. If the cover component encloses a central portion of, for example the circumference of, the housing portion, the cover component may have a better fit and stability. A central portion is for example in the middle of, in the centre of, in a midpoint, in a centreline of, for example the circumference of, the housing portion.

The present invention relates to different aspects including the cover component described above and in the following, and corresponding methods, devices, systems, kits, uses and/or product means, each yielding one or more of the benefits and advantages described in connection with the first mentioned aspect, and each having one or more embodiments corresponding to the embodiments described in connection with the first mentioned aspect and/or disclosed in the appended claims.

According to an aspect, disclosed is a headset comprising a cover component for a connection port in a housing portion of the headset, where the cover component is movable relative to the position of the connection port, where the cover component is arranged to at least partly enclose at least a part of the housing portion, and where the cover component is configured to be:

arranged in a first position where the connection port is uncovered by the cover component, and where a cable is configured to be inserted into the connection port; and arranged in a second position where the connection port is covered by the cover component.

In some embodiments the housing portion is circular cylindrical, for example substantially circular cylindrical. Alternatively, the housing portion may be circular, cylindrical, rectangular, rectangular cylindrical, squared, plane, oval etc. The cover component is configured to fit to the housing portion, and thus the housing portion and the cover component may resemble each other's shape to fit together, such as the inner dimension of the cover component resembling the outer dimension of the housing portion. If the housing portion is circular, the cover component should preferably be circular as well etc. The housing portion, or the circumference of the housing portion, may preferably be cylindrical or round, such as circular cylindrical, because the battery of the headset is typically arranged in the housing portion and the battery is typically round, so the housing portion is constructed to fit around the battery, while keeping the housing portion as little as possible.

In some embodiments the headset comprises an ear hook configured for attaching the headset to an ear of a user, when the headset is configured to be used for normal use being transmission of audio. The ear hook may be structurally connected with the cover component.

In some embodiments the connection port is a charger port, such as a USB port or any other suitable port for insertion of a cable, such as a USB cable, for charging the battery of the headset arranged in the housing portion.

In some embodiments the connection port is an update or updating port, such as a USB port or any other suitable port for insertion of a cable, such as USB cable, for updating the software of the processing unit in the housing portion of the headset.

BRIEF DESCRIPTION OF THE DRAWINGS

The above and other features and advantages will become readily apparent to those skilled in the art by the following detailed description of exemplary embodiments thereof with reference to the attached drawings, in which:

FIGS. 2a and 2b schematically illustrate examples of a cover component.

DETAILED DESCRIPTION

Figure 1:
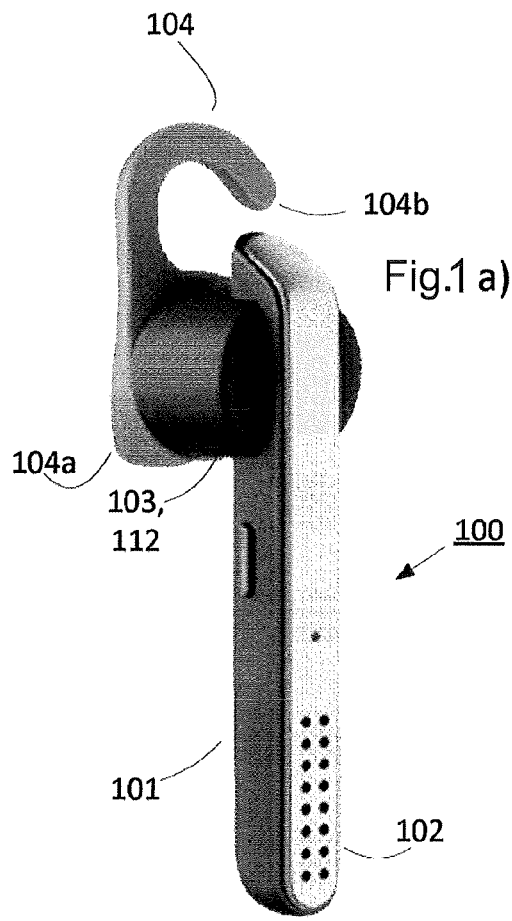
FIGS. 1a, 1b, and 1c schematically illustrate examples of prior art headsets.
Figure 1:
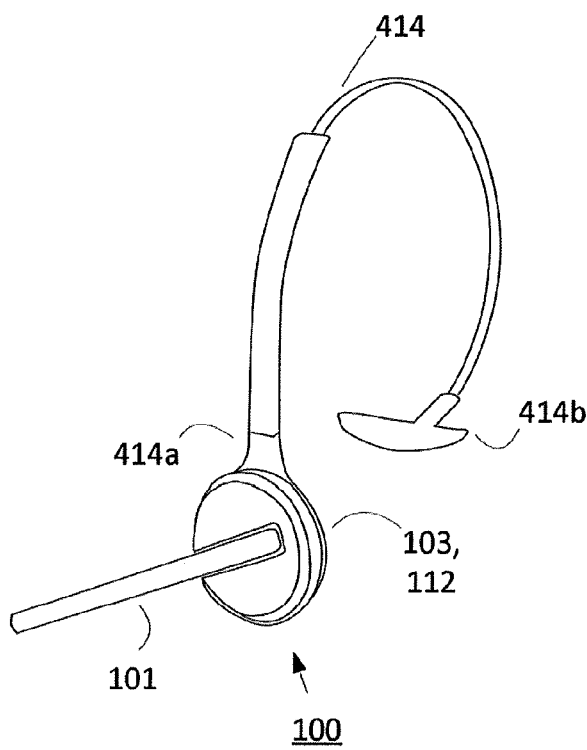

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Throughout, the same reference numerals are used for identical or corresponding parts.

Figure 1C:
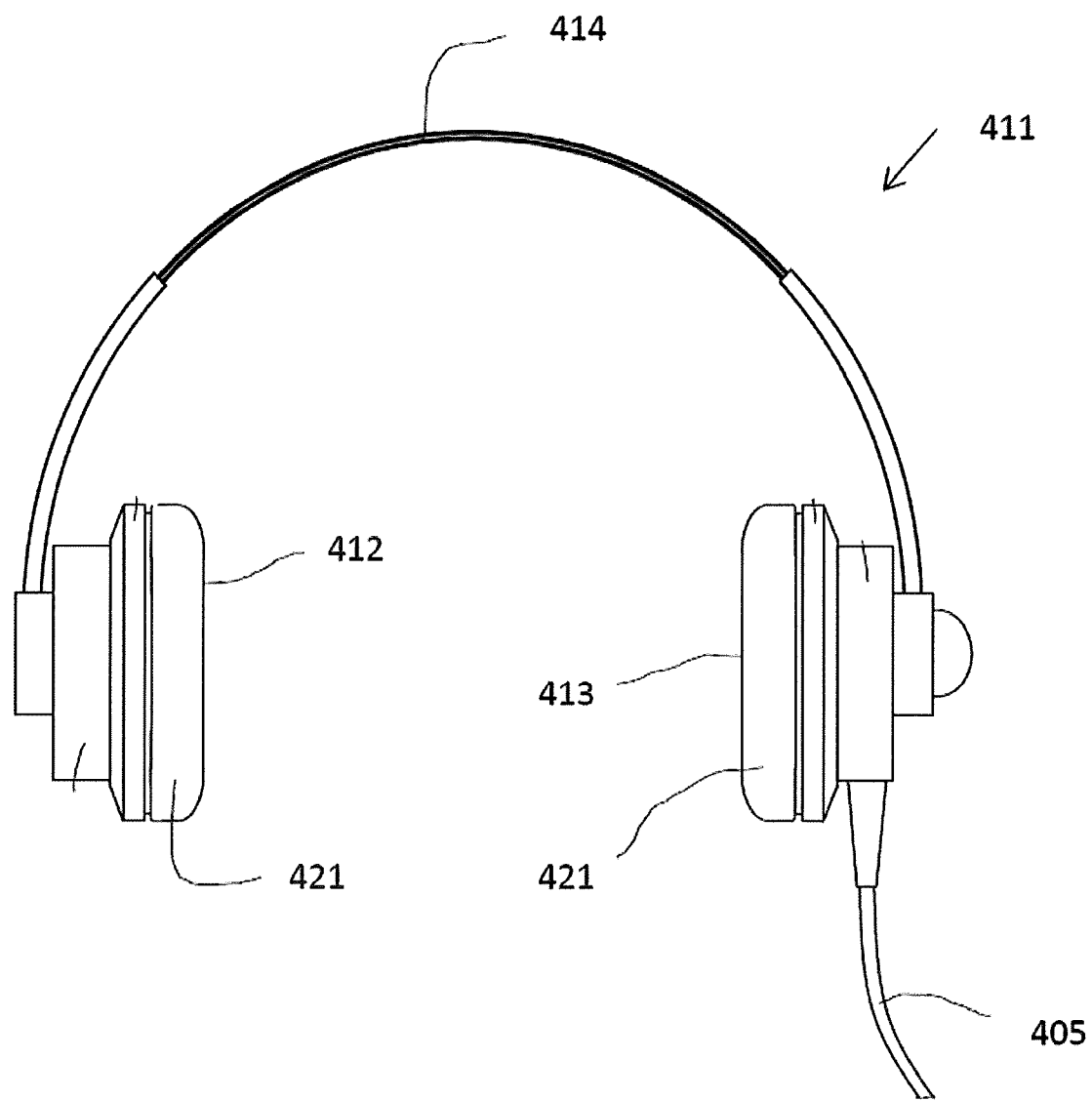

FIGS. 1a, 1b and 1c schematically illustrate examples of prior art headsets.

FIG. 1a illustrates an example of a headset 100 comprising a housing portion 103, and a microphone boom 101 attached to the housing portion 103. The housing portion 103 comprises an earphone 112. The microphone boom 101 comprising one or more microphones 102 and/or holes 102 for providing a directional microphone. An ear hook 104 is attached to the housing portion in a first end of the ear hook 104a, and a second end 104b of the ear hook 104 is shaped as a hook for attaching the headset 100 to an ear of a user.

FIG. 1b schematically illustrates an example of a headset 100 comprising a housing portion 103, and a microphone boom 101 attached to the housing portion 103. The housing portion 103 comprises an earphone 112. The microphone boom 101 may comprise one or more microphones and/or holes for providing a directional microphone. A headband 414 is attached to the housing portion in a first end of the headband 414a, and a second end 414b of the headband 414b is configured for attaching the headset 100 to the head of a user.

FIG. 1c schematically illustrates an example of a headset 411 comprising two housing portions 403, where each housing portion 403 comprises an earphone 412, 413. The housing portions 403 are connected by a headband 414. A removable cable 405 is attached in the earphone 413. Each of the earphones 412, 413 comprises ear cushions 421.

FIG. 2 schematically illustrates an example of a cover component.

The cover component 206 is for covering and uncovering a connection port 207 in a housing portion 203 of a headset. The headset may be a headset as shown in FIG. 1. The cover component 206 is movable relative to the position of the connection port 207, and the cover component 206 is arranged to at least partly enclose at least a part of the housing portion 203. As the housing portion 203 is circular cylindrical, the cover component 206 rotates relative to the housing portion 203 for covering and uncovering the connection port 207. In the preferred embodiment cover component 206 extends at least half way around the circumference of the body to which it is slideably affixed. In particular, it may extend 50, 60, 70, 80, 90% around the body, preferably sufficiently, that it has a greater tendency to stay snapped on the body that to spring therefrom. This typically occurs at over 50%. It is shown with less coverage in FIGS. 2a-b but the preferred construction conforms to FIGS. 3a-b.

FIG. 2a shows an example where the cover component 206 is configured to be arranged in a first position, where the connection port 207 is uncovered by the cover component 206. As the connection port 207 is uncovered, a cable (not shown) can be inserted into the connection port 207, for example the headset is configured to be charged by insertion of a charger or cable into the connection port 207. FIG. 2b shows an example where the cover component 206 is arranged in a second position, where the connection port 207 is covered by the cover component 206. Thus in this case a charger or cable cannot be inserted into the connection port 207, and the headset is configured to be used for its normal use, i.e. transmission of audio.

FIGS. 2*a-b* shows that the cover component 206 at least partly encloses a major part, such as a majority, a main part, the most of, or a greater part of the circumference of the housing portion 203. A major part may be such as more than 50%, 60%, 70%, 80%, or 90% of the area or the area of the circumference of the housing portion. The full circumference of the housing portion is 360 degrees when the housing portion is circular cylindrical, so the cover component may cover more than 180 degrees, more than 200 degrees, more than 250 degrees, more than 300 degrees, or more than 350 degrees of the circumference of the housing portion.

FIGS. 2*a-b* shows that the cover component 206 at least partly encloses a central portion of the housing portion 203. A central portion is for example in the middle of, in the centre of, in a midpoint, in a centreline of, for example the circumference of, the housing portion 203.

The cover component 206 may be made of a resilient material, such as a soft and flexible rubber material, such as a material which is more resilient than the material of the housing portion, whereby it is easier for the user to rotate the cover component 206 around the circumference of the housing portion 203 when the headset should be charged or software updated by insertion of a cable, such as a charger, such as a USB cable.

FIGS. 2*a-b* shows a first end 204*a* of an ear hook 204 structurally connected to the cover component. See FIG. 7 for more details of the ear hook 204.

Figure 3:
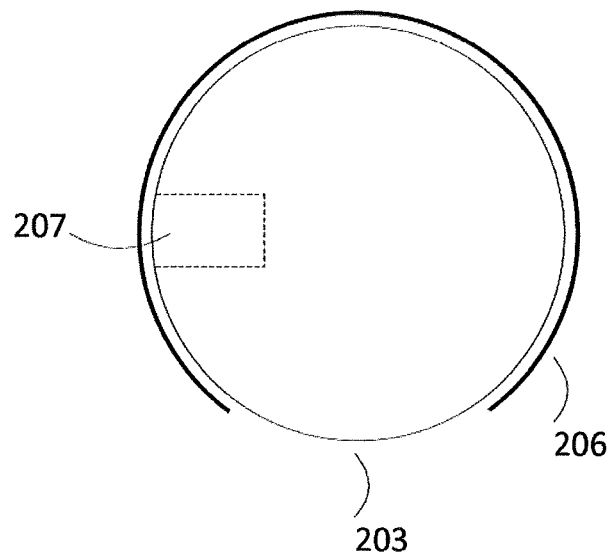
FIGS. 3a and 3b schematically illustrate examples of a cover component rotatable relative to the housing portion.
Figure 3:
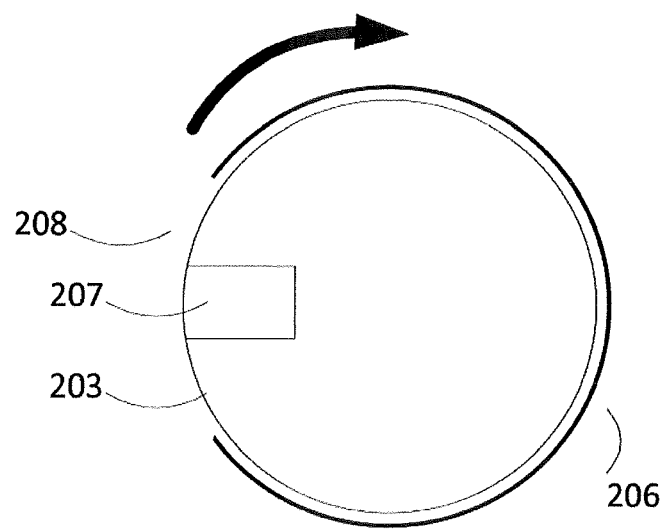

FIG. 3 schematically illustrates an example of a cover component which is rotatable relative to the housing portion.

The cover component 206 is rotatable relative to the position of the connection port 207, and the cover component 206 is arranged to at least partly enclose at least a part of circumference of the housing portion 203. As the housing portion 203 is circular cylindrical, and the cover component 206 is substantially circular, the cover component 206 is configured to rotate relative to the circumference of the housing portion 203 for covering and uncovering the connection port 207. When the cut-out 208 of the cover component 206 is arranged in front of the connection port 207, the connection port 207 is uncovered or exposed as seen in FIG. 3*b*. When the cut-out 208 of the cover component 206 is not arranged in front of the connection port 207, the connection port 207 is covered or closed as seen in FIG. 3*a*.

Figure 4:
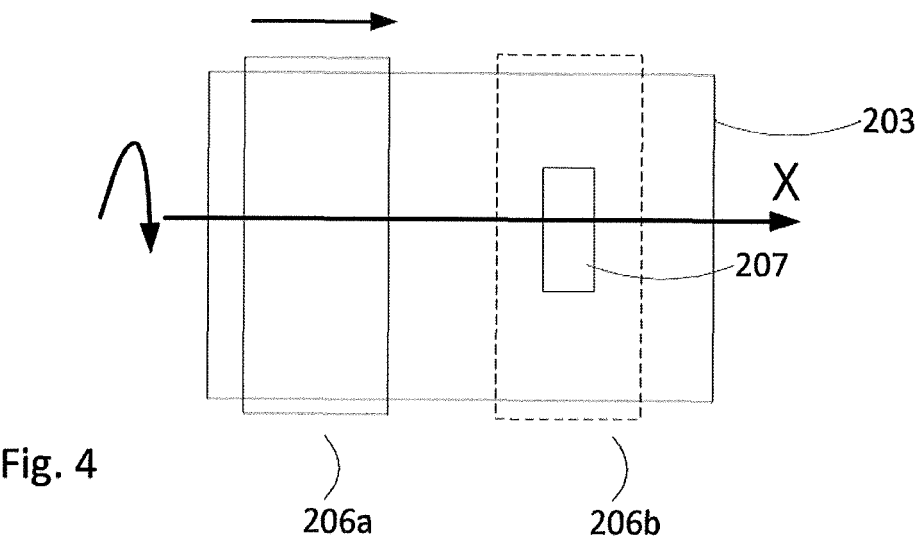
FIG. 4 schematically illustrates an example of a cover component.

FIG. 4 schematically illustrates an example of a cover component. The cover component 206 is for covering and uncovering a connection port 207 in a housing portion 203 of a headset. The headset may be a headset as shown in FIG. 1. The cover component 206 is movable in the x direction relative to the position of the connection port 207 in the housing portion 203, and the cover component 206 is arranged to at least partly enclose at least a part of the housing portion 203. The cover component 206 is movable in the x direction or along the x axis of a three dimensional coordinate system. The cover component 206 is movable, for example slidable or shiftable, along an axis, such as along a longitudinal axis of the housing portion 203, such that when the cover component 206 is arranged in a first position 206*a* the connection port 207 is uncovered by the cover component 206, and where the headset is configured to be charged by insertion of a charger into the connection port 207. The cover component is movable, such as slidable or shiftable, to be arranged in a second position 206*b* where the connection port 207 is covered by the cover component 206. The cover component 206 encloses a minor part of the circumference of the housing portion 203, such that the cover component 206 can move sideways on the housing portion 203.

Figure 5:
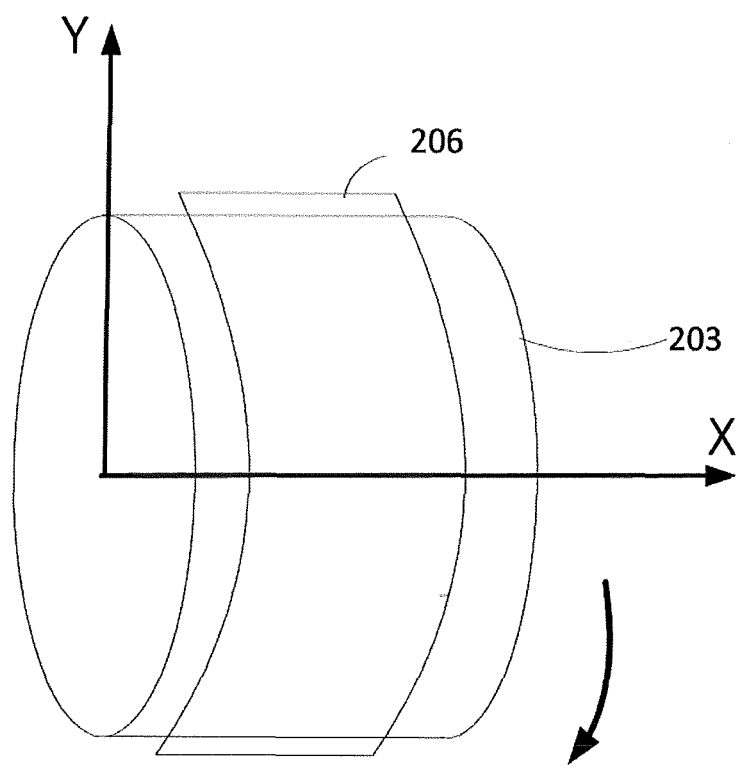
FIG. 5 schematically illustrates an example of a cover component.

FIG. 5 schematically illustrates an example of a cover component. The cover component 206 is movable relative to the position of the connection port (not shown), where the cover component 206 is arranged to at least partly enclose at least a part of the housing portion 203. The cover component 206 encloses a minor part of the circumference of the housing portion 203, such that the cover component 206 can move sideways on the housing portion 203 in an x direction as shown in FIG. 4, besides rotating around the circumference of the housing portion 203.

Figure 6:
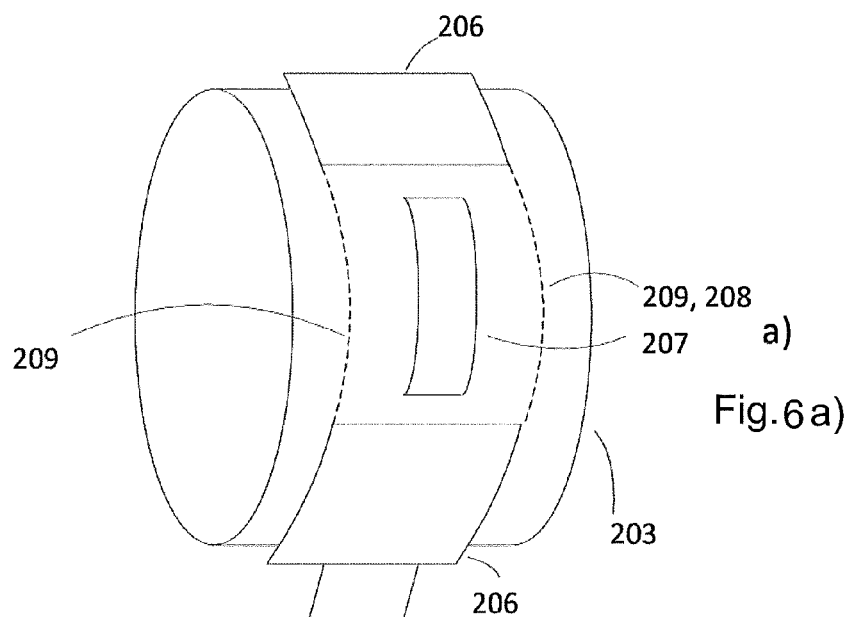
FIGS. 6a and 6b schematically illustrate examples of cut-outs in a cover component.
Figure 6:
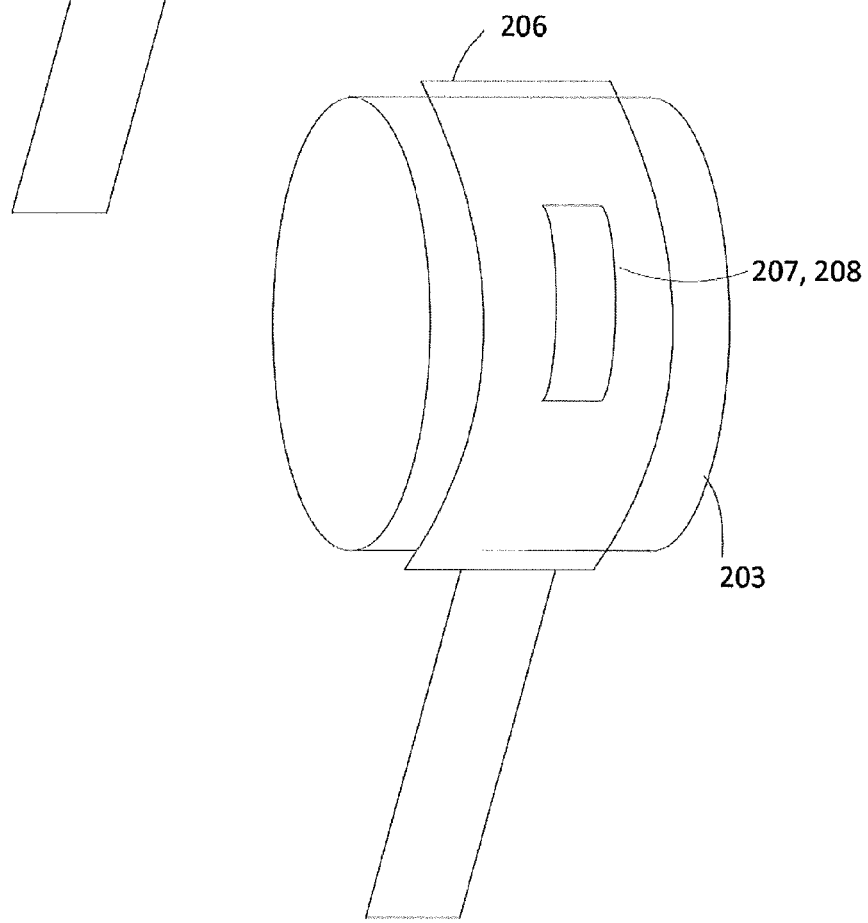

FIG. 6 schematically illustrates example of cut-outs in a cover component.

The connection port 207 is uncovered by the cover component 206 as the cover component 206 comprises a cut-out 208.

In FIG. 6*a* the cut-out 208 is illustrated by dashed lines 209. This is an example where the cover component 206 partly encloses the circumference of the housing portion 203. As the cover component 206 does not extend all the way around the circumference of the housing portion 203, the cover component 206 only partly encloses the housing portion 203. This cover component may be termed an open component as it is not closed around the housing portion. The missing part of the cover component exposing the connection port is the cut-out 208 of the cover component.

In FIG. 6*b* the cut-out 208 is illustrated as the hole in the cover component. This is an example where the cover component 206 entirely encloses the circumference of the housing portion 203. As the cover component 206 extends all the way around the circumference of the housing portion 203, the cover component 206 entirely, fully, wholly, completely encloses the housing portion 203. This cover component may be termed a closed component as it is closed around the housing portion. The missing part of the cover component exposing the connection port is the cut-out 208 of the cover component.

Figure 7:
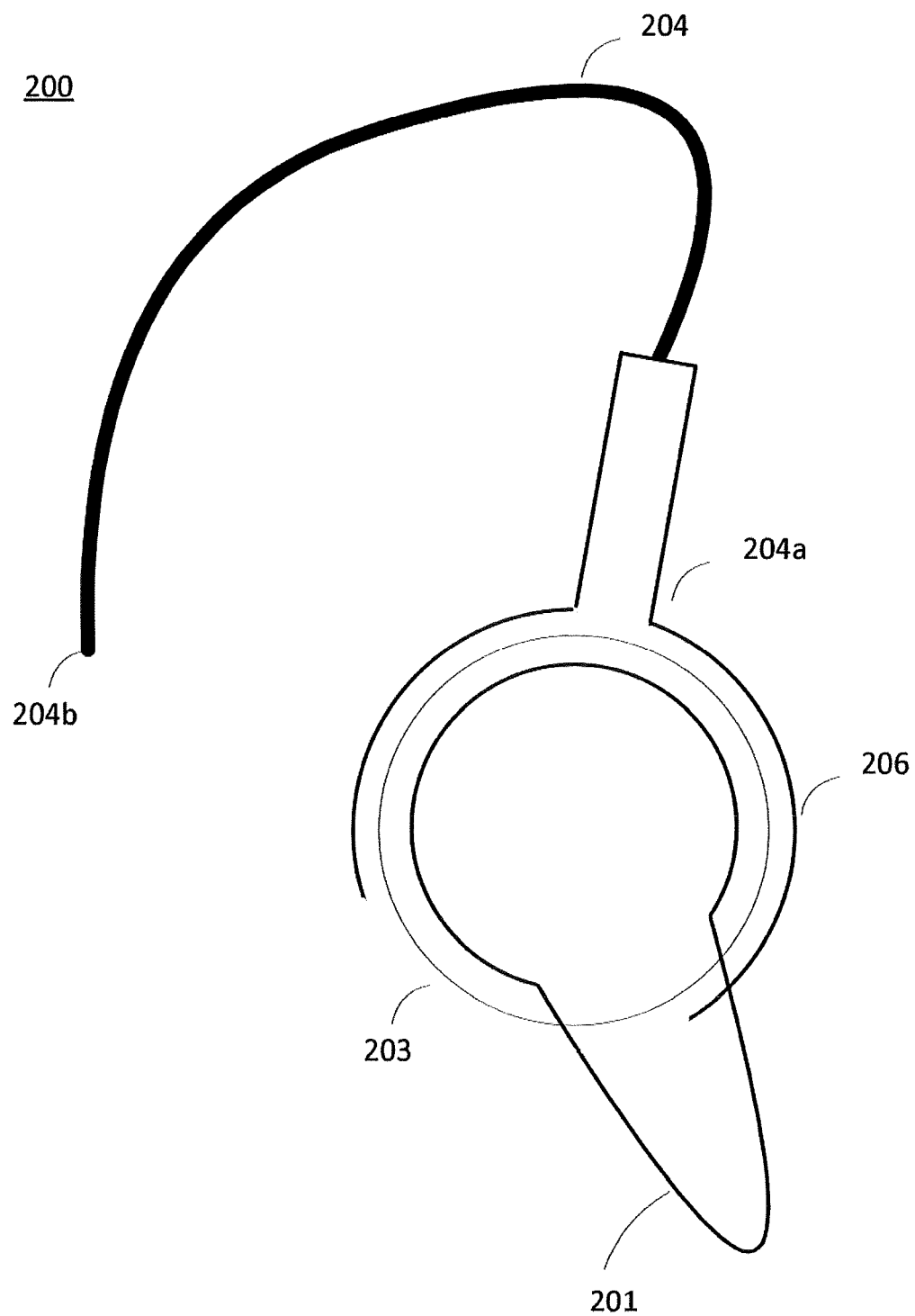
FIG. 7 schematically illustrates an example of a headset comprising a cover component connected to an ear hook.

FIG. 7 schematically illustrates an example of a headset comprising a cover component connected to an ear hook.

The headset 200 comprises a cover component 206 for a connection port (not shown) in a housing portion 203 of the headset 200, where the cover component 206 is movable relative to the position of the connection port, where the cover component 206 is arranged to at least partly enclose at least a part of the housing portion 203, and where the cover component 206 is configured to be:

arranged in a first position where the connection port is uncovered by the cover component 206, and where a cable is configured to be inserted into the connection port, for example where the headset 200 is configured to be charged or software updated by insertion of a cable, such as a charger, into the connection port; and arranged in a second position where the connection port is covered by the cover component 206.

The cover component 206 is structurally connected to an ear hook 204 of the headset 200, where the ear hook 204 is configured for attaching the headset 200 to an ear of a user. The cover component 206 is connected to a first end 204*a* of the ear hook 204. The second end 204*b* of the ear hook 204*b* is configured to be attached around the outer ear, or pinna, of the user's ear. The cover component is arranged on the housing portion 203 of the headset 200.

A microphone boom 201 is arranged on or in the housing portion 203. Alternatively, the cover component 206 may be structurally connected to the microphone boom 201 of the headset 200 instead of to the ear hook as shown in FIG. 7.

The housing portion 203 is circular cylindrical, such that the circular cover component 206 can rotate around the circumference of the housing portion 203. The connection port may be a charger port or a port for updating software, such as a USB port.

Although particular features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications and equivalents.

LIST OF REFERENCES 100, 200, 411 headset
101, 201 microphone boom
102 microphones or holes
103, 203, 403 housing portion
104, 204 ear hook
104a, 204a first end of ear hook
104b, 204b second end of ear hook
405 cable
206 cover component
206a first position of cover component
206b second position of cover component
207 connection port
208 cut-out
209 lines indicating cut-out
112, 412, 413 earphone
414 headband
421 ear cushion

The invention claimed is:

1. A cover component for a connection port in a housing portion of a headset, wherein the cover component is movable relative to the position of the connection port, where the cover component is arranged to at least partly enclose at least a part of the housing portion, and where the cover component is configured to be:
arranged in a first position where the connection port is uncovered by the cover component, and where a cable is configured to be inserted into the connection port; and
arranged in a second position where the connection port is covered by the cover component
wherein the housing includes a curved portion having a curvature, said curved portion containing the connection port and the cover component is curved to substantially match the curvature of the curved portion and wherein the cover is rotatable relative to the curved portion around a center axis (x axis) of the housing portion.

2. The cover component according to claim 1, wherein the cover component comprises a cut-out for uncovering the connection port, when the cover component is arranged in its first position.

3. The cover component according to claim 1, wherein the cover component is structurally connected to an ear hook of the headset, where the ear hook is configured for attaching the headset to an ear of a user.

4. The cover component according to claim 1, wherein the cover component is structurally connected to a microphone boom of the headset.

5. The cover component according to claim 1, wherein the cover component is circular.

6. The cover component according to claim 1, wherein the cover component is configured to entirely enclose the circumference of the housing portion.

7. The cover component according to claim 1, wherein the cover component is configured to partly enclose the circumference of the housing portion.

8. The cover component according to claim 1, wherein the cover component is configured to be arranged to at least partly enclose a major part of the housing portion.

9. The cover component according to claim 1, wherein the cover component is configured to be arranged to at least partly enclose a minor part of the housing portion.

10. The cover component according to claim 1, wherein the cover component is made of a resilient material.

11. The cover component according to claim 1, wherein the cover component is configured to be arranged to at least partly enclose a central portion of the housing portion.

12. A headset comprising a cover component according to claim 1 for a connection port in a housing portion of the headset, where the cover component is movable relative to the position of the connection port, where the cover component is arranged to at least partly enclose at least a part of the housing portion, and where the cover component is configured to be:
arranged in a first position where the connection port is uncovered by the cover component, and where a cable is configured to be inserted into the connection port; and
arranged in a second position where the connection port is covered by the cover component.

13. The headset according to claim 12, wherein the housing portion is circular cylindrical.

14. The headset according to claim 12, wherein the headset comprises an ear hook configured for attaching the headset to an ear of a user.

15. The headset according to claim 12, wherein the connection port is a charger port, such as a USB port.

* * * * *